Sept. 3, 1946.  W. A. DARRAH  2,407,062
APPARATUS FOR TESTING CONTAINERS
Filed Aug. 24, 1942  12 Sheets-Sheet 4
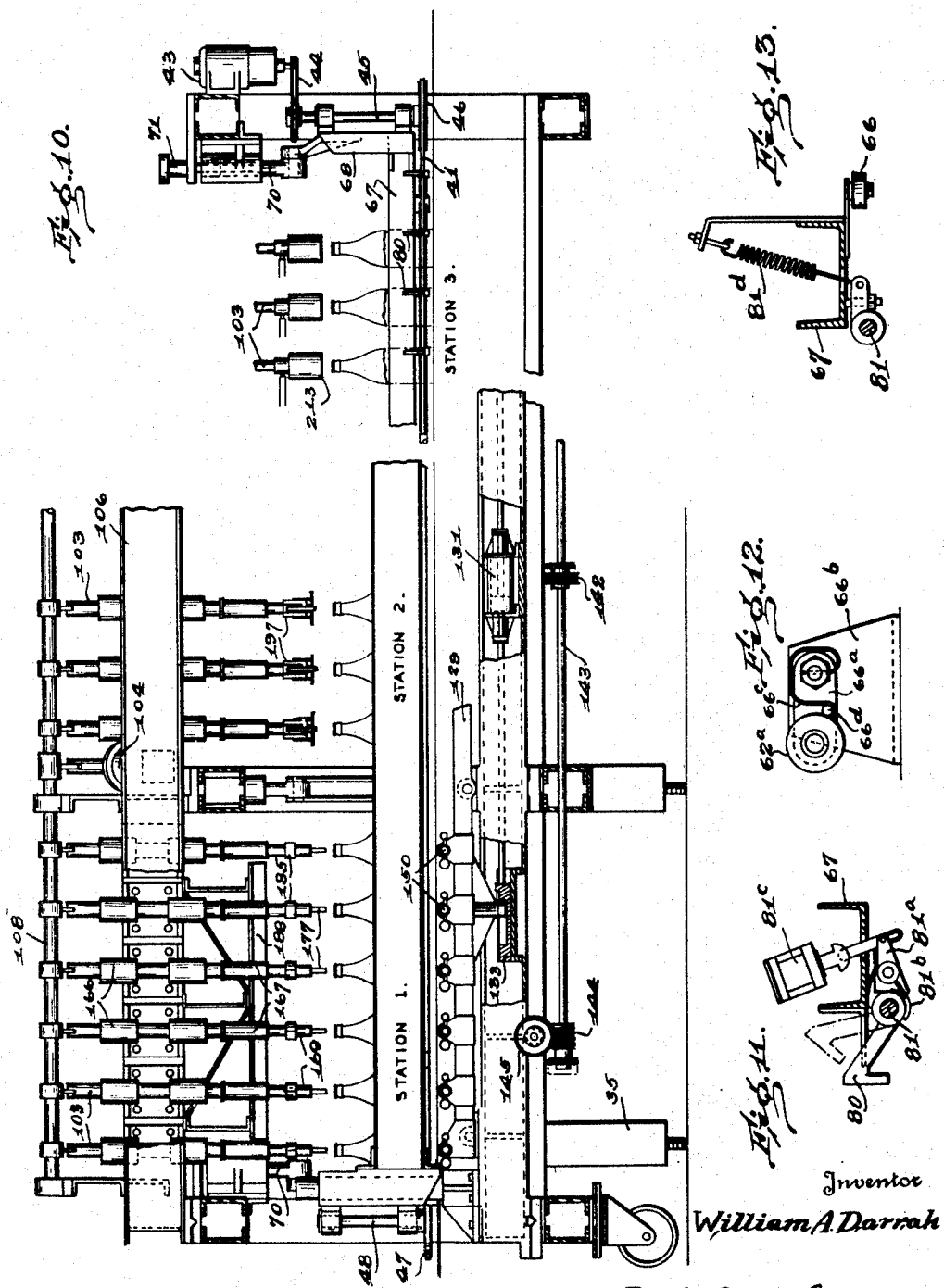
Inventor
William A. Darrah
By Rule and Hoge
Attorneys

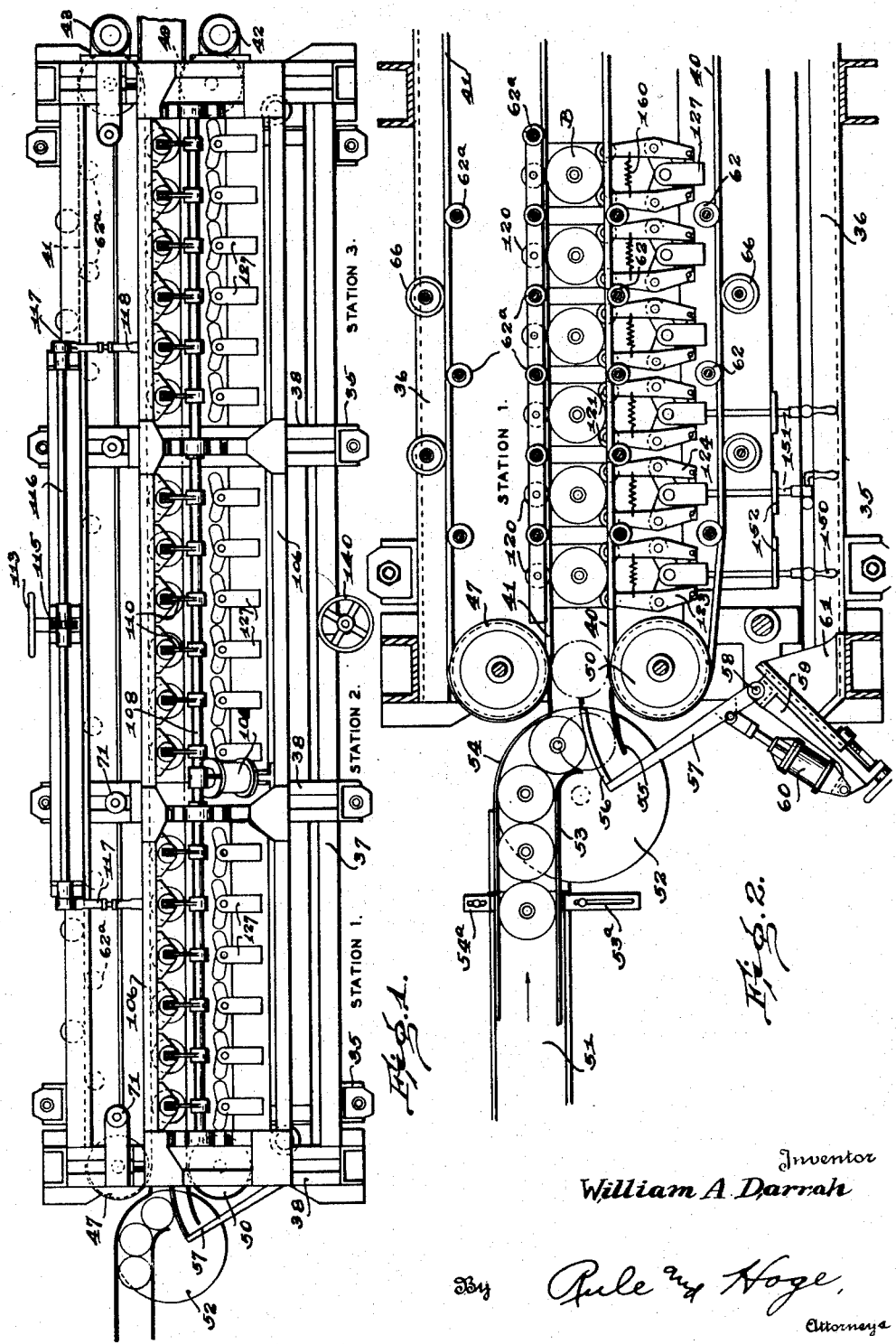

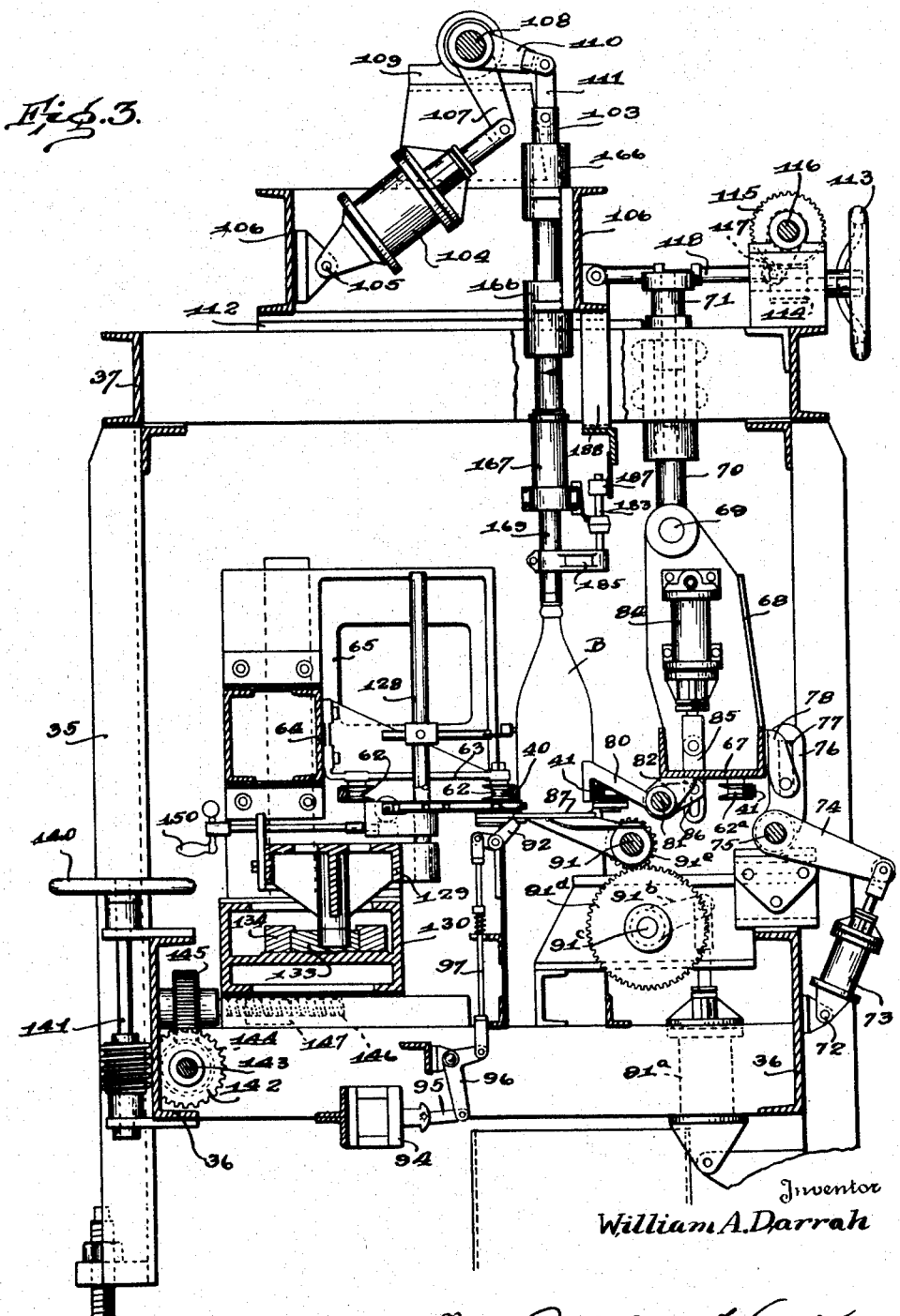

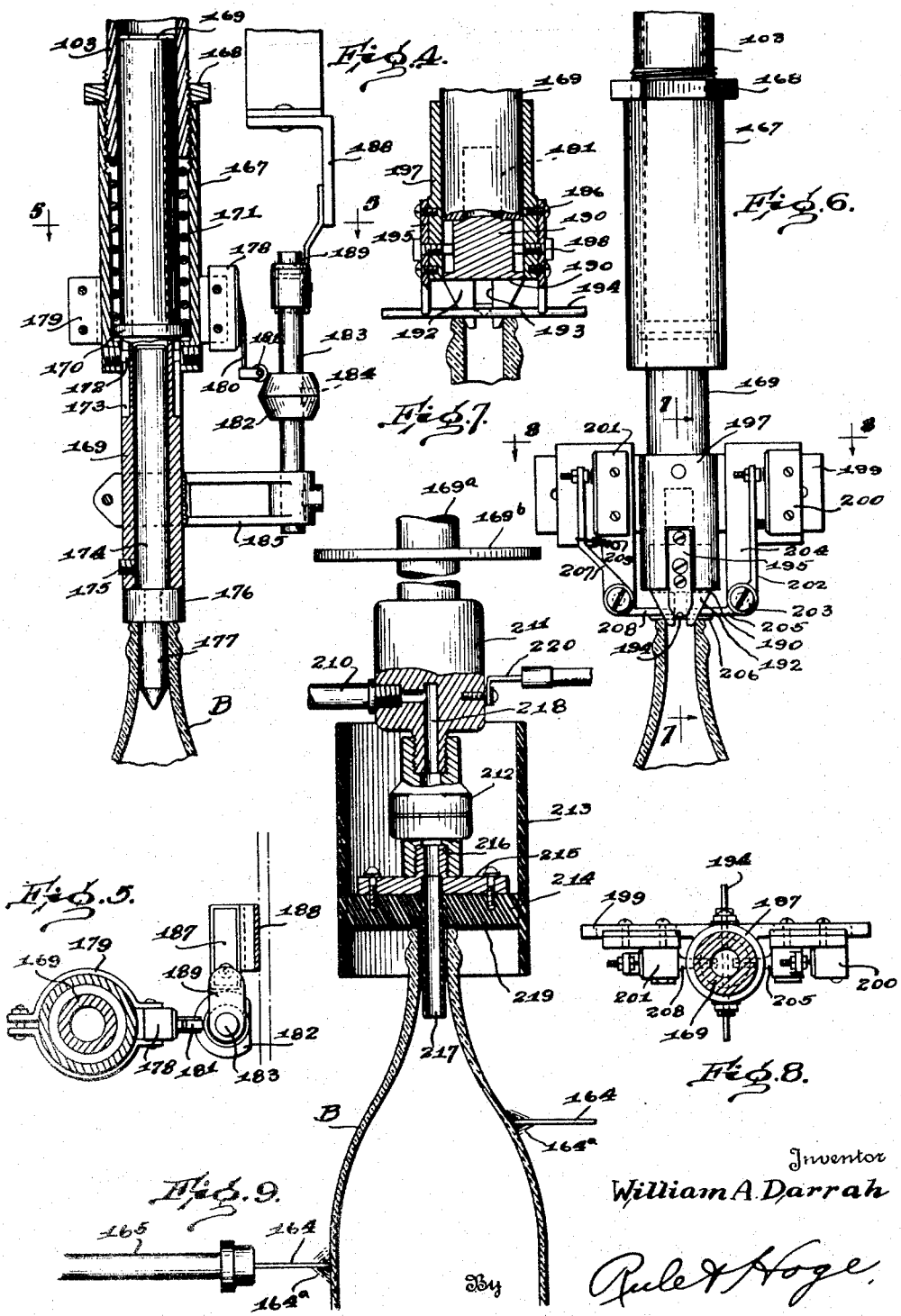

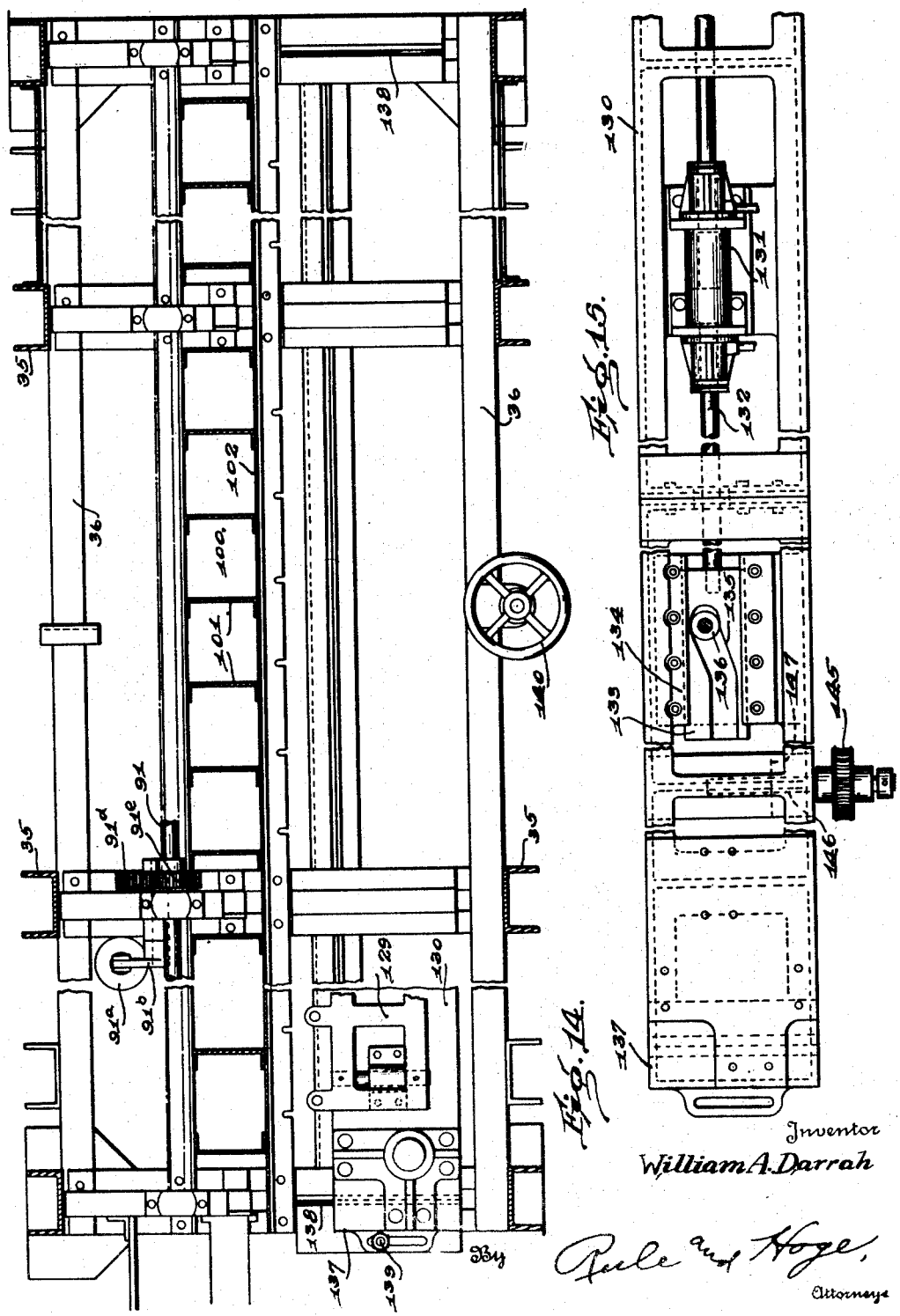

Sept. 3, 1946.  W. A. DARRAH  2,407,062
APPARATUS FOR TESTING CONTAINERS
Filed Aug. 24, 1942  12 Sheets-Sheet 6

Inventor
William A. Darrah

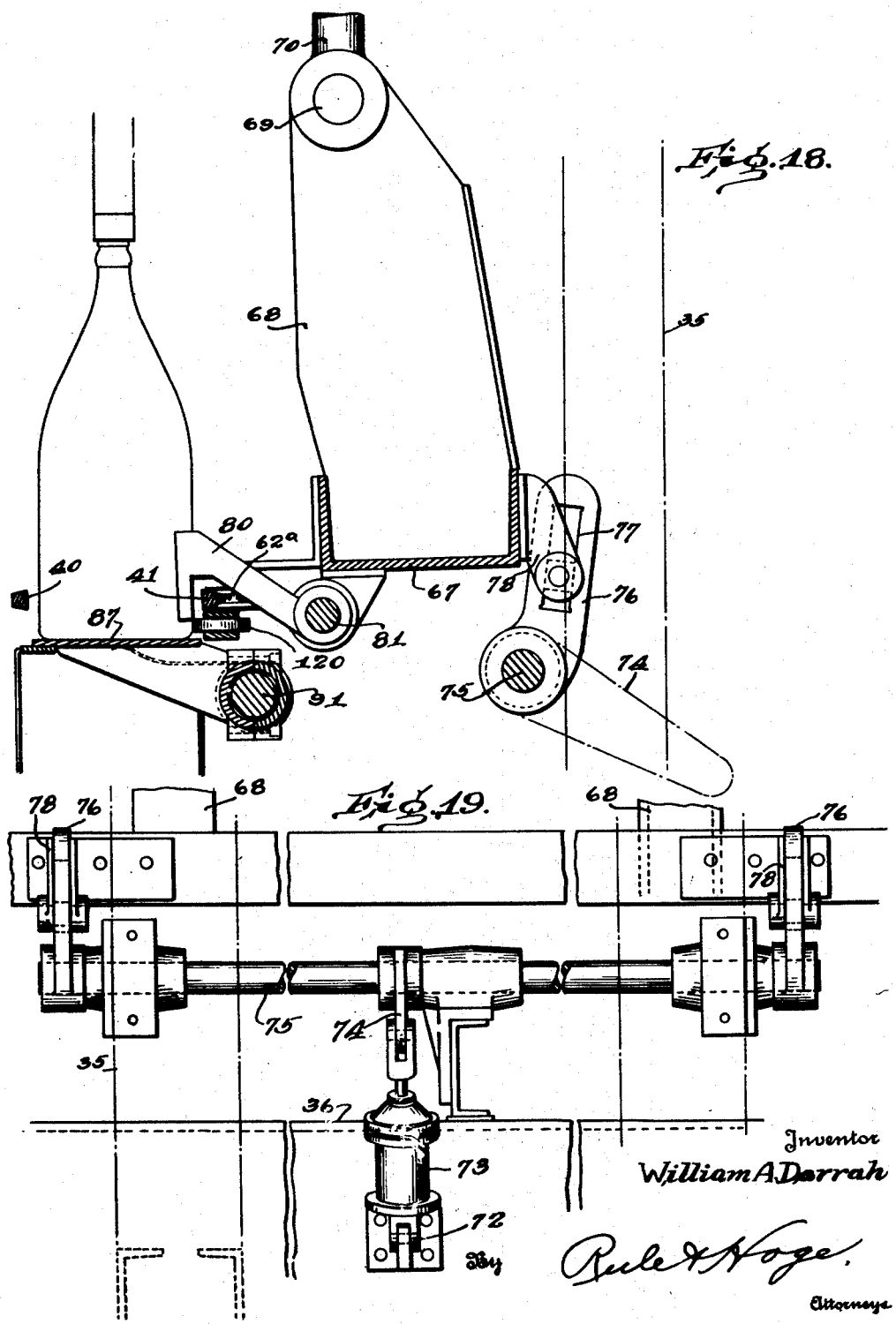

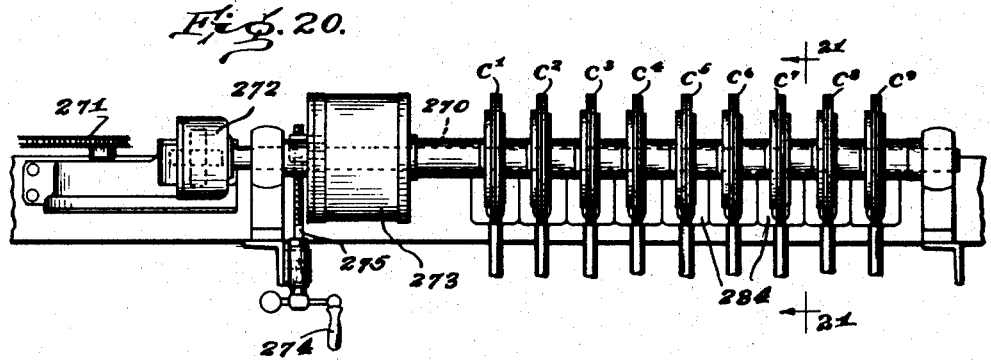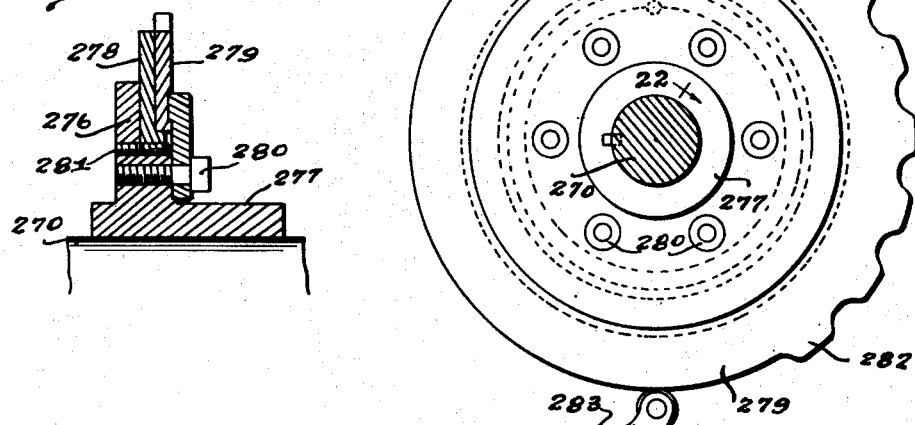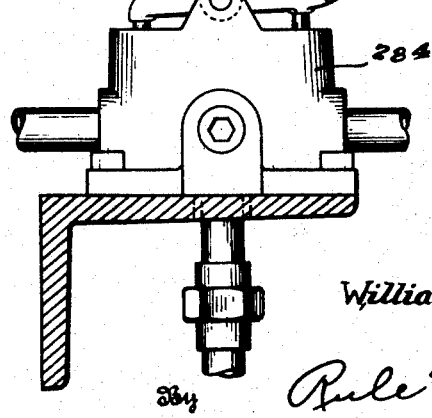

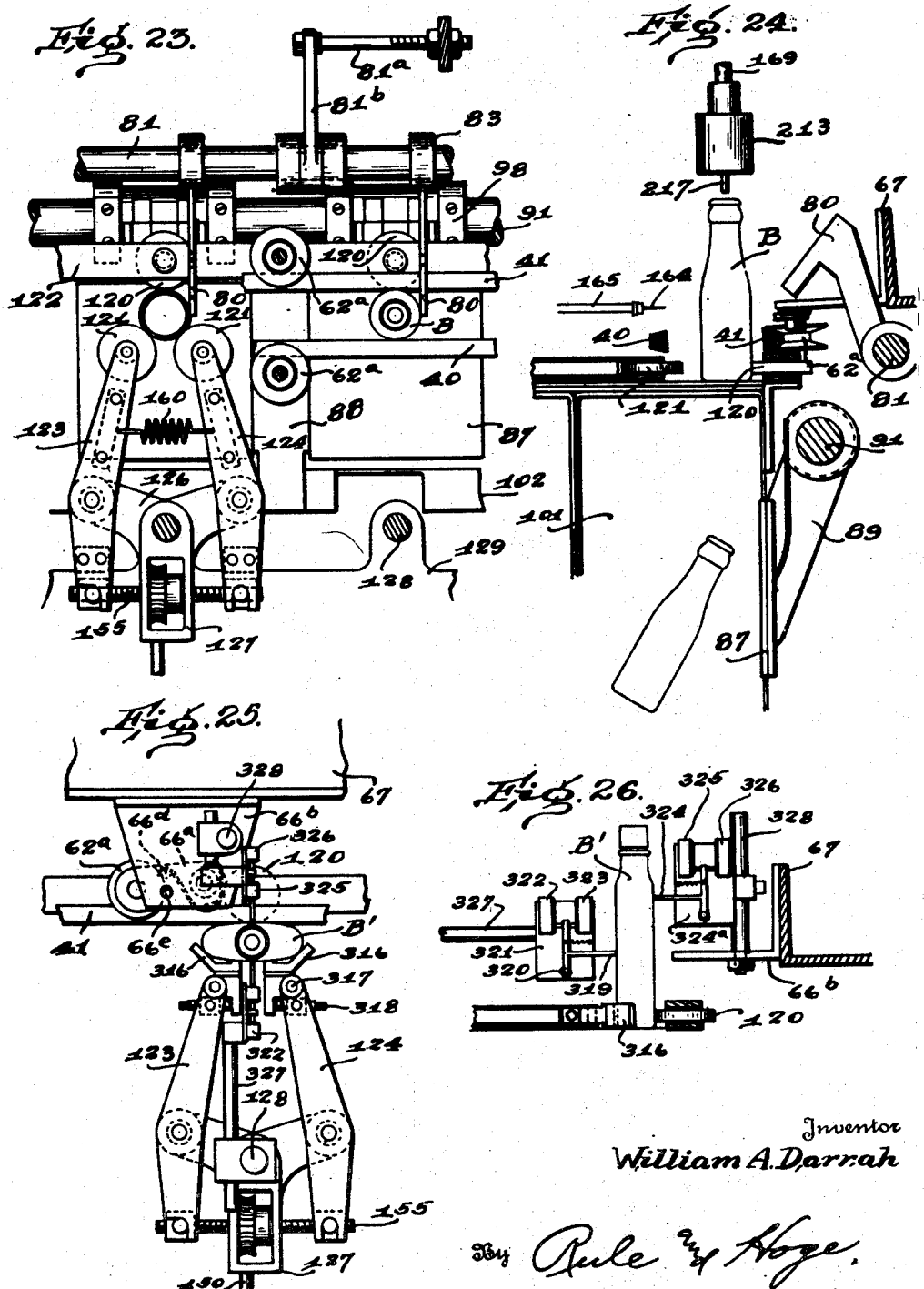

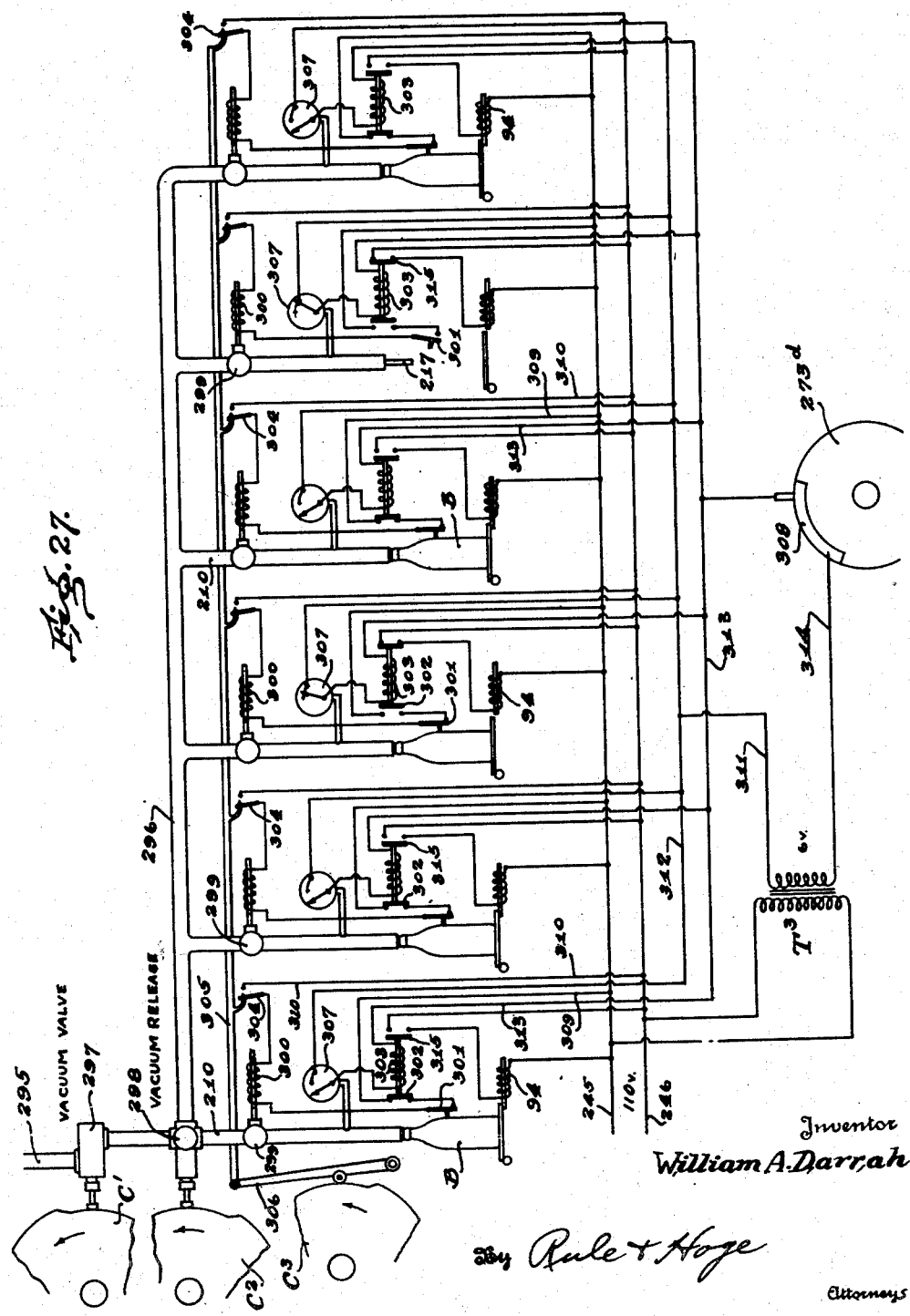

Sept. 3, 1946.  W. A. DARRAH  2,407,062
APPARATUS FOR TESTING CONTAINERS
Filed Aug. 24, 1942  12 Sheets-Sheet 11

Inventor
William A. Darrah
By Rule and Hoge
Attorneys

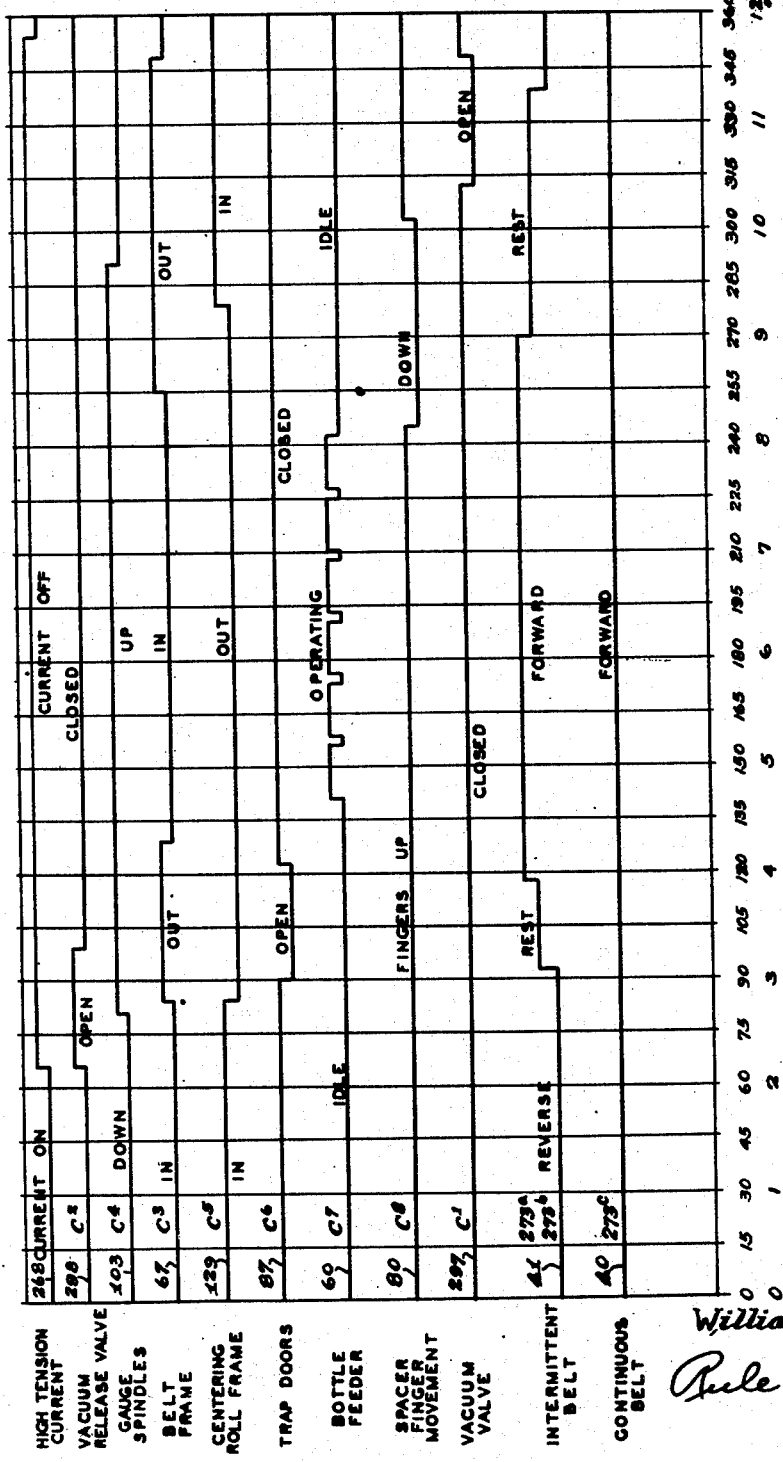

Patented Sept. 3, 1946

2,407,062

UNITED STATES PATENT OFFICE 2,407,062

APPARATUS FOR TESTING CONTAINERS

William A. Darrah, Chicago, Ill., assignor to Owens-Illinois Glass Company, a corporation of Ohio Application August 24, 1942, Serial No. 455,887

15 Claims. (Cl. 209—88)

My invention relates to apparatus for gauging bottles, jars and other hollow articles, testing them for a variety of imperfections, and automatically discarding defective ware. In the manufacture of glass bottles, jars and similar ware, it is practically impossible to produce uniformly perfect articles owing to the inherent nature of the glass which must be molded while in a hot plastic condition. While in such condition and during the gathering and blowing of the glass in the molds and the cooling, hardening and annealing processes, it is subject to many influences tending to distort the glass and introduce other imperfections.

At the present day it is the universal practice for trained inspectors, called selectors, to inspect the ware as it is taken from the annealing leer, discarding those articles having imperfections which are detected visually as the articles are rapidly handled. Modern requirements for commercial ware are exacting as to size, shape, capacity, finish, etc. This is particularly true, for example, in regard to bottles which are to be filled and sealed by automatic machinery which does not permit of any material deviations in size, shape or finish of the bottles. Further, in the use of such automatic filling machinery, it is customary to introduce a filling tube or nozzle into the neck of the bottle and for satisfactory operation the interior of the bottle neck must be accurate as to size and shape.

The requirements in respect to bottles and jars for use where such automatic filling machinery is employed, are rendered the more exacting because a defective container may tie up temporarily a long filling line, resulting in a loss many times greater than the cost of the container itself.

A further defect which is frequently found in bottles and other glass containers relates to small leaks or pinhole openings through the glass, which may be the result of seeds or air bubbles embedded in the glass and breaking through the walls of the container. It is impossible by the usual methods of inspection to detect many of the defects by which the articles fail to meet standard requirements.

An object of my invention is to provide automatic gauging and testing apparatus which will register defects such as above noted and by which the bottles or other articles which are defective are automatically segregated and discarded. Such defective bottles include bottles either longer or shorter than the specified length, leaky bottles (called "leakers"), bottles with imperfect finish or imperfect neck openings, bottles out-of-round or otherwise irregular as to size or shape, bottles which lean ("leaners"), owing to rounded, irregular or defective bottoms, bottles with sunken or bulged sides, oversize and undersize bodies, bottles with mold seams or other irregularities and various other defects.

A further object of my invention is to provide testing apparatus which will operate automatically with the precision, accuracy and reliability that are attainable by the use of mechanical, pneumatic and electrical devices for meeting the exacting requirements of such an apparatus designed to discard all articles which are defective or which do not measure up to prescribed standards for the uniform output of high quality ware. Such apparatus eliminates defective ware or reduces it to an extent impossible to attain where manual inspection is relied upon.

A further object of the invention is to provide apparatus for advancing the articles in a line through a number of testing stations or zones arranged one in advance of another and testing the articles for different defects in each zone.

The invention further provides for concurrently testing groups of articles in each of a plurality of testing zones and for segregating the defective articles from those which meet the tests.

Other objects of the invention will appear hereinafter.

Referring to the accompanying drawings which illustrate a testing machine or apparatus constructed in accordance with the principles of my invention:

Fig. 1 is a plan view of the apparatus.

Fig. 2 is a sectional plan on a larger scale, of a portion of the apparatus.

Fig. 3 is a cross-sectional elevation of the apparatus.

Fig. 4 is a sectional elevation of a testing unit for gauging the articles as to height or length, and for making various other tests.

Fig. 5 is a section at the line 5—5 on Fig. 4.

Fig. 6 is an elevation of a testing unit adapted for testing the top sealing surfaces or finishes of the bottles.

Fig. 7 is a section at the line 7—7 on Fig. 6.

Fig. 8 is a section at the line 8—8 on Fig. 6.

Fig. 9 is a sectional elevation showing a testing unit which provides means for vacuumizing the articles and thereby testing them for various defects, and also electrical means for testing wall thickness.

Fig. 10 is a part-sectional longitudinal elevation of the apparatus with parts broken away.

Fig. 11 is a detail view of a spacing finger and trip device.

Fig. 12 is a bottom plan view of one of the spring actuated pressure rolls distributed along the belt conveyor.

Fig. 13 is a detail view of means for rocking the finger shaft shown in Fig. 11.

Fig. 14 is a part-sectional plan view of the apparatus with portions broken away.

Fig. 15 is a fragmentary plan view showing means for shifting the frame which carries the article centering rolls.

Fig. 18 is a sectional view showing the swinging frame which carries the intermittent conveyor belt.

Fig. 19 is a fragmentary rear elevation of said frame and its operating means.

Fig. 20 is a view of the timer mechanism.

Fig. 21 is a section at the line 21—21 on Fig. 20 showing a timer cam disk and a valve operated thereby for controlling the bottle feeder motor.

Fig. 22 is a section at the line 22—22 on Fig. 21.

Fig. 23 is a fragmentary plan view showing article centering rolls and associated mechanism.

Fig. 24 is a fragmentary sectional elevation showing a trap in its open position for discharging a bottle.

Fig. 25 is a view similar to Fig. 23 showing a modification adapted for gauging panel ware and other flat or noncircular articles.

Fig. 26 is a side elevation of the mechanism shown in Fig. 25.

Fig. 27 is a diagram of the vacuum system and its electrical control.

Fig. 29 is a timer chart showing the timing of the various operations.

Figure 16:
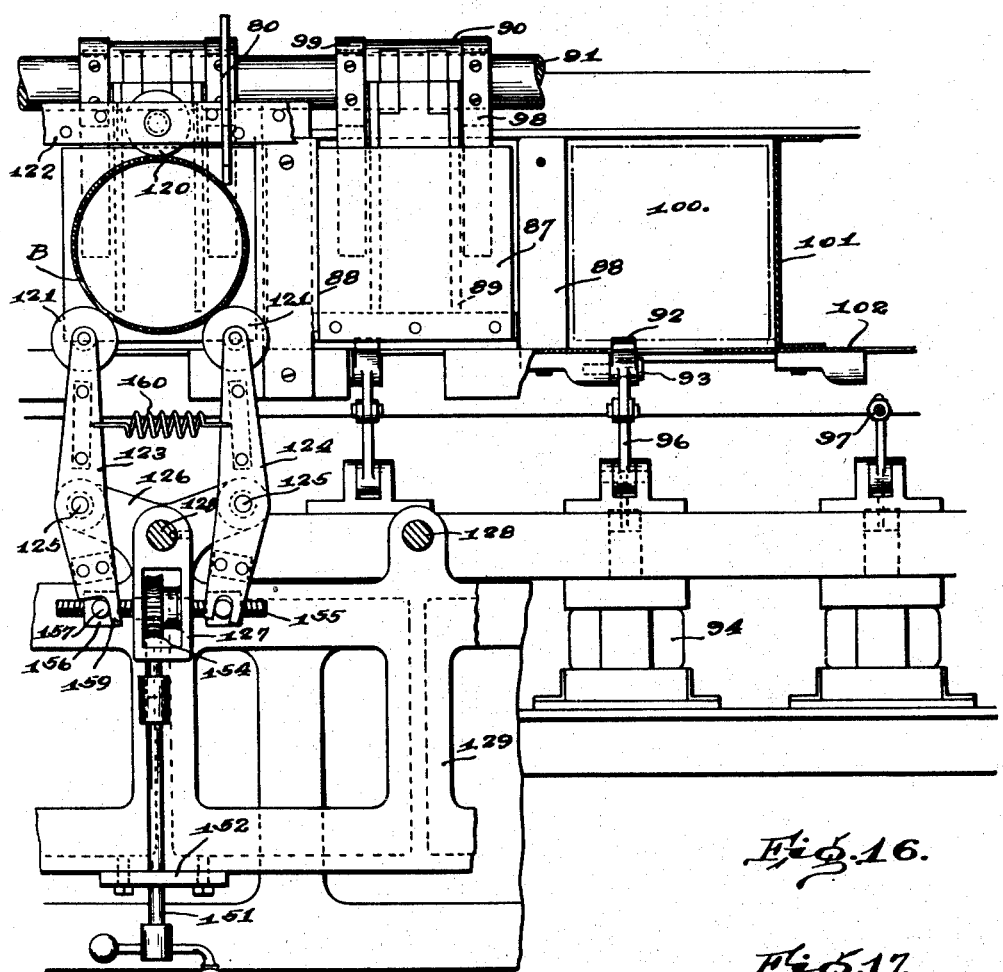
Fig. 16 is a fragmentary plan view showing means for centering and holding the articles during the testing operations.
Figure 17:
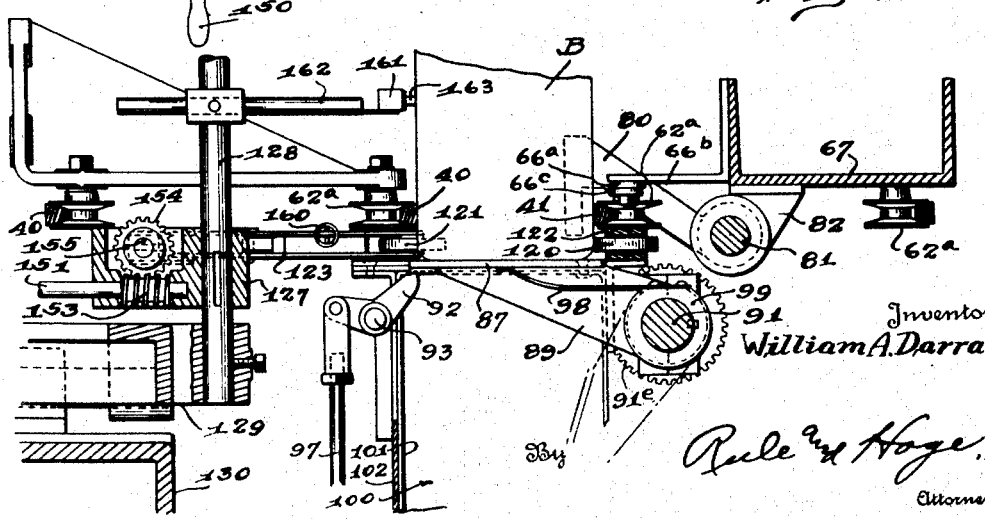
Fig. 17 is a sectional elevation of parts shown in Fig. 16.

The apparatus as herein illustrated and described in detail is particularly adapted for testing bottles but may be adjusted and adapted for testing various other articles.

Referring to the drawings, the bottles B are fed into the apparatus at one end thereof and are conveyed in a straight line extending lengthwise of the apparatus, passing through the testing stations in succession. In the particular form of apparatus illustrated there are provided three testing stations numbered 1, 2 and 3, (Figs. 1 and 10) each adapted to accommodate a group of six bottles. The testing operations are carried on at the several stations concurrently. After the tests have been made on the groups of bottles at the three stations, all of the bottles are advanced simultaneously so that the group at station 3 is discharged and the groups at stations 1 and 2 are advanced to stations 2 and 3 respectively while a new group of bottles is fed into station 1.

The apparatus is supported by a framework including upright channel bars 35 to which are secured horizontal lower girders 36 which extend the full length of the apparatus and support the major portion of the apparatus. Upper longitudinal channel bars 37 are mounted on the uprights 35 and support cross girders 38 spaced at intervals lengthwise of the apparatus.

The bottles are conveyed through the testing stations by a pair of endless V-belts 40 and 41 (Figs. 1, 2, 3) which are arranged to engage the sides of the bottles adjacent the lower ends thereof. The belts 40 and 41 are driven respectively by electric motors 42 and 43 (Fig. 1). The motor 43 as shown in Fig. 10 has a driving connection with the belt 41 through gearing including a belt 44 and vertical shaft 45 to which is connected a pulley 46 over which the conveyor belt 41 is trained. The belt 41 is also trained over an idler pulley 47 on a shaft 48 at the intake end of the apparatus. The driving connections from the motor 42 to the conveyor belt 40 may be a duplicate of those just described, the belt 40 being trained over a drive pulley 49 (Fig. 1) and an idler pulley 50. The conveyor belt 40 is driven continuously and the belt 41 intermittently, the motor 43 and belt 41 also being periodically reversed for purposes set forth hereinafter.

Referring to Figs. 1 and 2, the bottles are carried to the apparatus on a horizontally traveling conveyor 51 and transferred to the conveyor belts 40 and 41 by transfer or feeder mechanism including a disk 52 on which the bottles are received from the conveyor 51. Stationary guide rails 53 and 54 direct the bottles into position to be advanced between the conveyors 40, 41, each bottle being arrested by a stop bar 55 when in such position. Adjustable mountings 53ª, 54ª permit adjustment of the rails for bottles of different diameters. The bottles are pushed forward to a position between the conveyors 40, 41, by a pusher finger 56 on a rock arm 57 which is pivoted at 58 to a base plate 59. A piston motor 60, mounted on the plate 59, is operatively connected to the rock arm 57 and is periodically actuated for oscillating said arm and thereby pushing the bottles in succession into position between the feeder belts. The base plate 59 is adjustably mounted in inclined slideways on a stationary bracket 61 permitting adjustment of the pusher finger for ware of different sizes while maintaining the direction of force applied through the finger substantially normal to the surface of the bottle at the point of contact.

The motor 60 operates while the conveyor belts 40 and 41 are both moving in a forward direction, to impart six strokes to the pusher finger 56 thereby introducing six bottles to the testing station 1, the motor 60 then remaining at rest until the testing operations have been effected. The operations of the motor 60 are under the control of a timer cam C⁷ (Figs. 20, 21) which actuates the motor valve as hereinafter set forth.

The belt 40 is supported in part and guided by a series of idler pulleys 62 (Figs. 2, 3) positioned at short intervals along the inner surface of the belt. Said pulleys are carried on bracket arms 63 attached to a frame 64 comprising channel bars extending throughout the length of the apparatus and supported on end frame members 65. The conveyor belt 41 is in like manner guided and supported on idler pulleys 62ª positioned at intervals lengthwise of the apparatus.

Rolls 66 (Figs. 2, 13) are arranged at intervals along the strands or leads of the belts remote from the bottle line and bear against the exterior surfaces of the belts for holding them against the guiding rolls 62, 62ª. The rolls 62ª positioned along the bottle line may be yieldingly mounted for applying spring pressure to the belt 41 for holding it in driving engagement with the bottles. The spring mounting for these rolls as shown in Figs. 12 and 25 comprises rock arms 66ª, each pivoted at one end to a bracket 66ᵇ or other stationary support. The roll 62ª is carried on the free end of the arm and is held with a spring pressure against the belt by a spring 66ᶜ, one end of which is hooked on a pin 66ᵈ on the arm 66ᵃ. The swinging movement of the roll 66 is limited by a stop pin 66ᵉ (Fig. 25) projecting from the arm into an enlarged opening in the bracket 66ᵇ.

The pulleys 62ᵃ and also the end sheaves over which the conveyor 41 is trained, are mounted on a swinging frame 67 by which the conveyor is periodically swung to and from operative position. Said frame includes a channel bar extending lengthwise of the apparatus and end hangers 68 which are connected by pivots 69 to vertical rods 70. The latter may be adjusted up and down by means of adjusting nuts 71 threaded on the rods and supported on the framework.

The frame 67 is periodically swung about the pivots 69 by means of an air operated piston motor 73 (Figs. 3, 19), connected by a pivot 72 to the framework of the apparatus. The piston rod is connected to a rock arm 74 on a rock shaft 75. Rock arms 76 fixed to the shaft 75, have slot and pin connections 77 with pairs of lugs 78 secured to the frame 67. The motor 73 is under the control of a timer cam and operates periodically through the connections just described to swing the frame 67 and withdraw the conveyor belt 41, permitting the bottles to be discharged.

After a group of bottles have been fed between the conveyors 40, 41 and the preceding bottles advanced along the line, they are accurately spaced along the conveyors by means of spacing fingers 80 (Figs. 3, 16, 17, 18, 23) on a rock shaft 81 which is journalled in bearing brackets 82 attached to the frame 67. As shown in Fig. 23 the fingers 80 are carried on collars 83 mounted on the shaft 81 and adjustable thereon both lengthwise and rotatively of the shaft. The shaft is also adjustable lengthwise as may be required for positioning the spacer fingers for different sized articles which are under test. This adjustment of the shaft is effected by means of an adjusting rod 81ᵃ (Fig. 23) connected to an arm 81ᵇ journalled on the shaft, the rod being adjustably attached to a stationary support.

The shaft 81 is periodically rocked for swinging the spacing fingers upward out of the path of the bottles, by means of a piston motor 84 (Fig. 3) mounted on a hanger 68. The piston rod of the motor is connected through a link 85 to a rock arm 86 on the shaft 81. The motor 84 operates under the control of a timer cam C⁸ (Fig. 20) as hereinafter set forth.

The spacing fingers are held in their lifted position by a spring actuated pivoted latch 81ᵃ (Fig. 11) which, when the fingers are lifted, engages behind a lug 81ᵇ on the shaft. The latch is released by an electromagnet 81ᶜ under the control of the timer mechanism. When the latch is released, the shaft 81 is rocked to lower the spacing fingers 80 by means of a tension spring 81ᵈ (Fig. 13).

Means providing a bottom support for the bottles includes a series of bottom plates 87 alternating with spacing strips 88 (Fig. 16) on the same level therewith to provide a continuous smooth surface on which the bottles slide as they are carried forward. The bottom plates are spaced to correspond to the spacing of the testing spindles hereinafter described and support the bottles during the testing operations. The bottom plates are individually hinged to swing downward under the control of the testing devices and thus serve as trap doors for discharging defective bottles and thereby segregating them from those which pass the tests. Each bottom plate 87 is carried on a rock arm 89 (Figs. 16, 17) attached to a bearing sleeve 90 which is journalled on a rock shaft 91. The bottom plates are normally held in their bottle supporting position by latches 92 individual thereto, each latch projecting beneath the forward end of the bottom plate. Each latch is mounted to swing on a pivot pin 93 and is actuated by an electromagnet 94 (Figs. 3 and 16). The armature of the electromagnet has operating connection with the latch through a link 95, bell crank 96 and a vertical rod 97.

The electromagnets 94 are controlled automatically as hereinafter described by the corresponding bottle testing units so that the magnets are energized selectively when defective bottles are tested, and operate to trip the latches 92. After a latch is tripped the trap door is temporarily held up by means including a pair of leaf springs 98 (Figs. 16, 17) attached to collars 99 keyed to the shaft 91. The shaft 91 is automatically rotated through an angle of about 90° after each series of bottle tests thereby swinging the arms 98 downward. If one or more of the latches 92 have been tripped owing to defects in the bottles under test, the corresponding bottom plates will be free to swing downward with the arms 98 allowing such defective bottles to drop and thereby be separated from the remaining bottles. The bottles are discharged through vertical chutes or passageways 100 (Fig. 14) formed by vertical plates 101 spaced at intervals between parallel plates 102 extending lengthwise of the apparatus.

The means for rocking the shaft 91 to withdraw the arms 98 from the trap doors, comprises a piston motor 91ᵃ (Figs. 3 and 14), the piston rod of which is connected to a rock arm 91ᵇ on a rock shaft 91ᶜ to which are keyed gears 91ᵈ running in mesh with pinions 91ᵉ on the shaft 91. The motor 91ᵃ is under the control of the timer cam C⁶ (Fig. 20).

The testing units are arranged in a row extending along the bottle line, each unit comprising a vertical shaft or spindle 103 positioned above the path of the bottles. These units include a group of 6 spindles in each testing zone or station. Each spindle carries a testing device or devices. These are adapted for the particular tests to be made in the respective zones. All of the spindles are periodically lowered simultaneously to operative position. The means for lifting and lowering the spindles includes a piston motor 104 (Figs. 3 and 10) connected by a pivot 105 to a frame 106 which carries the spindles 103. The motor piston is connected to a rock arm 107 fixed to a rock shaft 108 journalled in brackets 109 on the frame 106. Rock arms 110 fixed to the shaft 108 are connected through links 111 to the spindle shafts 103. The motor 104 is operated under the control of a timer cam C⁴ (Fig. 20) which operates the motor valve as hereinafter described.

The frame 106 is mounted for adjustment transversely of the apparatus, being slidable on guideways 112. The adjusting means includes a hand wheel 113 (Figs. 1 and 3) on a shaft carrying a worm gear 114 which meshes with a worm wheel 115 keyed to a shaft 116. Rock arms 117 on the outer ends of the shaft 116 are connected through rods 118 to the frame 106. Rotation of the hand wheel 113 operates through the worm gearing 114 to adjust the frame 106 and the spindles carried thereby for positioning the latter to correspond with the position of the axes of the bottles under test, which position varies with the diameter of the bottles.

Means for centering the bottles with respect to the testing units and holding the bottles centered during the testing operations, includes groups of centering rolls individual to the units. Each said group comprises a roll 120 (see Figs. 16, 17) to engage one side of the bottle and a pair of rolls 121 at the opposite side of the center line of the bottle. The rolls 120 are all mounted on the under side of a stationary bar 122 extending lengthwise of the apparatus, and are made of steel or other hard material to provide a fixed point of contact with the bottle under test. The rolls 121 of each group are made of rubber or other yieldable material and are journalled on the inner ends of a pair of arms 123, 124 which swing on pivots 125 on a pair of ears 126 formed on a block 127. The latter is adjustably mounted on a vertical shaft or post 128 supported on a frame 129. This frame extends lengthwise of the apparatus and provides a support for all of the shafts 128 and is mounted for periodic movement in a direction transverse to its length for moving the centering rolls 121 into and out of operative position. For this purpose the frame 129 is slidably mounted on a stationary frame 130 (Figs. 3, 14, 15) which extends parallel therewith.

The means for shifting the frame 129 includes an air operated piston motor 131 (Figs. 10, 15) mounted on the frame 130 and having a piston rod 132 extending in opposite directions from the motor cylinder. The outer ends of the piston rod are connected to cam slide blocks 133 which are slidable in guideways 134 on the frame 130. Each slide block is formed with a cam track or groove 135 in which runs a cam follower roll 136 on the slide frame 129. The motor 131 is operated periodically under the control of a timer cam $C^5$ (Fig. 20) and actuates the cams for moving the frame 129 and the centering rolls 121 to and from the bottle centering position shown in Fig. 16.

The stationary frame 130 is manually adjustable forwardly and rearwardly for positioning the guide rolls 121 to accommodate articles of various sizes. For this purpose the frame is mounted by means of end brackets 137 (Figs. 14, 15) fixed to the frame and slidable along guides 138. Clamping bolts 139 extending through slots in the brackets serve to clamp the frame in its adjusted position. When the bolts are loosened the frame may be adjusted by means of a hand wheel 140 (Figs. 3 and 14) attached to a worm shaft 141 which drives a worm wheel 142 on a shaft 143 (see Fig. 10) extending lengthwise of the apparatus. The shaft 143 is journalled in the main frame of the machine and carries worm gears 144 adjacent its opposite ends, each of which meshes with a worm wheel 145. Each of the worm wheels 145 is keyed to a screw shaft 146 journalled in the main frame and threaded through a nut 147 attached to the frame 130.

Figs. 16 and 23 show adjustments of the centering rolls 121 for testing bottles of comparatively large and small diameters respectively. Adjusting devices individual to the pairs of rolls, each includes a hand crank 150 attached to a shaft 151 which has a bearing in a plate 152 secured to the frame 129. The inner end of the shaft carries a worm 153 (Fig. 17) which meshes with a worm gear 154 keyed to a shaft 155 journalled in the gear box or block 127. The shaft 155 is formed with right and left-hand screw threads to receive correspondingly threaded nuts 156 formed with bearing pins 157 to engage the arms 123 and 124. The arm 124 is forked to straddle the pin 157 so that the arm is held against swinging movement in either direction about its pivot. The arm 123 is formed with a finger 159 which contacts the pin 157 and limits the inward movement of the roll 121 thereon but permits outward movement thereof against the tension of a coil spring 160.

The posts 128 within the first zone or station 1, in addition to serving as carriers for the centering rolls 121, also provide a mounting for gauging devices, each of which comprises a micro-switch 161 (Fig. 17) carried on a rod 162 adjustably secured to the post 128. Each of these devices comprises a contact piece 163 adapted to engage the side wall of the bottle under test. During the testing operation the bottle is rotated about its own axis as hereinafter set forth and if the bottle is out-of-round or non-circular at the line of contact with the gauging device or if the diameter is either greater or smaller than the required diameter, the contact piece 163 operates the micro-switch. The latter controls the corresponding electromagnet 94 as more fully set forth hereinafter and actuates it for effecting a discharge of the defective bottle in the manner above described. The rod 162 may be adjusted to any desired position lengthwise of the post. Also if desired a plurality of these gauges may be mounted on each of the posts for testing the bottles at different heights.

The posts 128 within the third zone or station 3 also carry bottle testing devices. These may consist of electrodes in the form of needles 164, brushes or the like, (Figs. 9 and 24) carried on rods 165 attached to the posts. These contacts are connected in a high tension electrical circuit for testing the wall thickness of the bottles as more fully set forth hereinafter.

Gauging devices are provided at station 1 for testing the height or length of the bottles, size of the neck openings, and for making certain other tests. These devices are all of the same construction which will now be described, reference being had particularly to Figs. 3, 4 and 5. Each shaft 103 is mounted for up-and-down movement in bearing sleeves 166 on the frame 106. The lower end portion of the shaft 103 is screw threaded to receive the upper threaded end of a tubular shaft 167 which forms an adjustable extension of the shaft 103. The parts are locked in adjusted position by a nut 168.

Mounted for up-and-down movement within the shaft 103, 167, is a tubular shaft 169 formed with a collar 170 and yieldingly held in its lowered or extended position by a coil spring 171 held under compression between the collar 170 and the lower end of the shaft 103. The shaft 169 is held against rotation within the shaft 167 by means of a pair of lugs 172 which are threaded through the shaft 167 and project into grooves 173 in the shaft 169. A rod 174 is mounted in the shaft 169 and is adjustable up and down therein and held in adjusted position by a clamping screw 175.

The lower end of the rod is formed with a head 176 adapted to seat on the upper end surface or finish of the bottle under test. Said head also provides a shoulder to limit the movement of the rod 174 within the tube 169. A plunger tip 177 which is threaded into the head 176, is adapted to enter the neck of the bottle and serves to hold the bottle in position while being gauged for height and also serves for testing the bottle for various defects as will presently be pointed out.

A micro-switch 178 is attached to the tube 167 by a pair of straps 179 and carries a flexible arm 180 provided with a cam follower roll 181. A cam 182 formed with an inclined cam surface with which the roll 181 contacts, is mounted on a post 183. The cam is adjustable up and down on the post and held in adjusted position by a set screw 184. The post is carried in a bracket 185 secured to the shaft 169.

The operation of the gauging device shown in Figs. 3 and 4 is as follows:

When the motor 104 operates to lower the rods 103, each plunger tip 177 enters the neck of a bottle which is held centered therebeneath by the guide rolls 121, and the head 176 seats on the bottle. If the bottle is of normal height and shape, the downward movement of the shaft 169 carrying the cam 182 is arrested shortly before the rod 103 completes its downward movement so that there is a final movement of the shaft section 167 relative to the shaft 169 and cam 182. This brings the cam roll 181 to a position on the cam determined by the height of the bottle. If this height is within the required limits determined by the adjustment of the apparatus, the micro-switch remains open. If the bottle is above normal height the switch arm 180 is moved inward far enough to operate the switch. This establishes a circuit for the corresponding electromagnet 94 so that the bottle is eventually discarded.

If a bottle is below the prescribed height a micro-switch 187 (Fig. 5) is operated. This switch is mounted on a hanger 188 attached to and depending from the frame 106. An arm 189 (Fig. 5) attached to the post 183 extends outwardly over the micro-switch. When the height of the bottle is below normal the shaft 169 and with it the arm 189 are carried downward to a point at which the arm 189 actuates the micro-switch 187 before the head 176 seats on the bottle. The micro-switch 187 also controls the electromagnet 94 and causes its operation and thereby effects the discharge of the bottle. When the plunger tip 177 is prevented from passing downward its full length into the bottle neck owing to any defect such as a neck opening below normal size, a crooked neck, a neck opening out-of-round, or any defect such as a rounded or inclined bottom which causes the bottle to tilt, the cam 184 operates in the same manner as when the bottle is above normal height, to effect the discharge of the bottle.

The testing units at station 2 are equipped with means particularly adapted for testing the top surfaces or finishes of the bottles and discarding those defective in this respect. The defects may include seams, projections, uneven or inclined surfaces and other irregularities. The construction of one of these testing units is shown in detail in Figs. 6 to 8 inclusive. It includes a centering head 190 having a stem 191 threaded into the lower end of the shaft 169. The head 190 is provided with a tapered or frusto-conical tip 192 divided into four sections by means of slots 193 which are perpendicular to each other. A horizontal rod 194 extends through one of said slots and is attached to the lower ends of a pair of straps 195 which are secured by screws 196 to a sleeve 197 keyed on the shaft 169. The gauging head 190 is held against rotative movement by screws 198 which project into vertical slots in said head.

The sleeve 197 is formed with a plate 199 which provides a mounting for micro-switches 200 and 201 positioned at opposite sides of said sleeve. The micro-switch 200 is adapted to be actuated by an arm 202 mounted by means of a pivot 203 on an arm 204 attached to the plate 199. The arm 202 has a finger 205 extending inwardly from the pivot and provided with a knife-edge bearing 206 adapted to rest on the bottle. An arm 207 for actuating the micro-switch 201 has a contact finger 208 also provided with a knife-edge bearing. The arm 202 is arranged to operate its switch when swung outwardly whereas an inward movement of the arm 207 is required for operating its switch.

The operation of the means for testing the bottle finishes is as follows:

When the shaft 103 is lowered the rod 194 seats on the bottle finish and the tip 192 holds the bottle centered. During this test the bottle is rotating and if the top surface or finish is perfectly level and smooth the switch operating arms 202 and 207 are held in such position that the micro-switches are not operated. If the surface under test has a fin, seam or other irregularity which causes the finger 205 to be swung upward about its pivot 203 the switch 200 is operated, thereby causing the corresponding electromagnet 94 to be actuated so that the bottle is discarded. In like manner any depressions or any irregularities in the surface under test which would permit the finger 208 to move downward relative to the rod 194 would operate the switch 201, causing the electromagnet to be actuated for discarding the bottle, as the electromagnet is under the control of both switches.

At station 3 the bottles undergo further tests. One of the testing units at this station is illustrated in detail in Fig. 9. A test made at this station comprises evacuating the bottle or reducing the air pressure therein and then testing the wall thickness at any desired point or points by means of an alternating current, preferably of high voltage. The air is exhausted from the bottle by applying suction through a vacuum line including a suction pipe 210 of rubber or other nonconducting material, connected to a metal head 211 having a passageway 218 extending therethrough and opening into a tubular connector 212 attached to said head. An insulating shell 213 has an insulating disk 214 secured therein and is attached to the lower end of the connector 212 by means of a metal plate 215 secured to the disk and having a nipple 216 threaded into said connector. A tubular metal stem 217 which is threaded into the plate 215, serves as a nozzle to be projected into a bottle and through which the air is exhausted. Said nozzle also serves as an electrode in the high tension circuit. The disk 214 is provided with a liner 219 adapted to seat on the bottle when the testing unit is lowered, thereby forming a seal and permitting the air to be exhausted from the bottle.

The liner may consist of material such as used commercially for liners for bottle and jar caps, for sealing the containers. This permits a test for leakage under conditions similar to those met with in practice. The disk is preferably made of comparatively hard material permitting a reliable test which will detect minute imperfections which might not be disclosed by the use of a softer sealing material. When the air has been exhausted from the bottle, a valve in the vacuum line is closed by means of a timer cam permitting tests for leakage as hereinafter described.

The head 211 is connected to the lower end of a shaft 169ª which is made of insulating material and is connected to the shaft 103 to permit up-and-down movement of the sealing head and for seating the liner 219 on the bottle. Where high voltage currents are to be employed an insulating disk 169ᵇ may be attached to the shaft 169ª. The electric current may be supplied through an alternating current step-up transformer T¹ (Fig. 28), the primary coil of which is connected to the mains 245, 246 of a commercial circuit or other source of alternating current supply. The secondary coil 247 of the transformer together with the testing head and all charged wires may be enclosed or surrounded by a wire mesh cage, to meet any required safety standards. External conductors including the contacts 164 are preferably grounded. The connector 212 (Fig. 9) is made of conducting material and comprises relatively rotatable sections having swivel connection permitting the shell 213 to rotate with the bottle during the tests.

The electrical circuit includes a conductor 220 connected to the head 211, the circuit being extended downward through the connector 212 to the nozzle 217 which serves as an electrode. The contact element 164 which may be either a needle, brush or other form of contact or electrode, is preferably held against the bottle during the test. If round bottles or articles are under test they are rotated to bring the entire circumference thereof under the test. In testing flat or non-round bottles, they may travel with the conveyors and thereby cause the contact element to move transversely across the surface under test.

The electrical test is made after the air has been withdrawn from the bottle or rarefied to such a degree that when the alternating current is applied there is an ionized condition resulting in an electrical charge on the entire interior surface of the bottle. The electrodes 217 and 164 are connected in circuit with the high tension secondary 247 (Fig. 28) of the transformer. This circuit may be traced through conductors 248, 248ª, electrode 217, bottle B, electrode 164, a galvanometer G¹ or ammeter, and conductors 249, 249ª. The bottle, together with the electrodes, serves as a condenser so that an alternating current is produced, which current is indicated by the galvanometer G¹. The volume of the current will depend upon the wall thickness at the point of contact of the electrode 164, and also upon the frequency of the current.

When the current flowing through the galvanometer G¹ exceeds a value determined by the minimum permissible wall thickness of the bottle under test, the galvanometer needle operates to close a circuit, or actuates a micro-switch to close such circuit, which includes a relay magnet coil 250. This coil is in circuit with the secondary 251 of a step-down transformer T², the primary of which, as shown, is connected across the mains 245, 246. This circuit may be traced from one terminal of the transformer through conductors 252, 253, galvanometer G¹, coil 250, and conductors 254, 255 back to the transformer. The coil 250 being thus energized closes a contact 256 in the circuit with the trip magnet coil 94 individual to the bottle under test. The coil 94 as shown, is connected in a direct current circuit comprising the mains 257 and 258 of a commercial circuit or other source of current supply. The circuit for the trip magnet coil may be traced from the positive main 259 through conductors 259, 260, 261, contact 256, coil 94 and conductors 262, 263 to the main 257. The trip magnet is thus operated to effect a discharge of the defective bottle. It will be noted that there are provided at station 3 a number of galvanometers G¹ equal to the number of testing units; namely 6, each having associated therewith a relay magnet 250 and trip magnet 94, the circuits for the galvanometers being arranged in parallel as are also the circuits for the coils 250 and the circuits for the trip magnet coils 94.

An important feature of the present invention relates to the use of an alternating current of sufficiently high voltage to produce at the contact 164, a brush discharge or corona 164ª. This serves to increase the effective area of electrical contact between the contact element and the surface of the glass and correspondingly increases the capacity of the condenser and the volume of current induced in the transformer circuit. I have found that in this manner a current of sufficient volume for practical purposes is readily obtained with the use of a transformer on an ordinary commercial line; for example a 60 cycle circuit. This has substantial advantages over the use of a comparatively low voltage requiring a correspondingly high frequency.

A further method of electrically testing the wall thickness comprises the application to the electrodes 217 and 164, of an electromotive force of sufficiently high voltage to cause a disruptive discharge by which the wall of the bottle is pierced, when the wall thickness is less than a predetermined permissible minimum thickness. When the wall is thus punctured the electrical discharge is sufficient to actuate the micro-switch for effecting the operation of the trip magnet. The puncturing of the container wall in this manner also permits leakage and dissipation of the vacuum. This may be utilized for causing operation of the vacuum testing means as described elsewhere, for discarding the defective bottles.

The transformer T¹ is preferably connected in circuit only for the time interval required for making the high tension electrical tests during each cycle of operations. The means for opening and closing the transformer circuit includes a timer disk 268 on a continuously rotating timer shaft 270, the disk having a contact segment 269 which periodically opens and closes the primary circuit of the transformer.

The term "vacuum" is herein used as a relative term, rather than to connote an absolute vacuum, and may be defined as a degree of rarefaction well below atmospheric pressure. The term "vacuumize" is likewise used to indicate such a rarefaction.

Although the tests for wall thickness, using high tension currents have been described in connection with the use of a vacuum, it is to be understood that said tests may be made by the use of relatively high voltages without vacuumizing the containers or reducing the air pressure therein. I have found however that there are substantial advantages obtained in the use of vacuum in co-operation with the high voltage electric currents. Further, by the use of a comparatively high frequency electromotive force the importance of using a vacuum in testing the wall thickness is correspondingly reduced. The higher frequencies also make it possible to reduce the voltage while attaining equally accurate tests.

The term "high voltage" as herein used refers to voltages ranging from 20 to 60 kilovolts or higher. The term "high frequency" refers to frequencies which are well above the range of the standard 60 cycle commercial circuits, and may include frequencies within the range of 1000 cycles per second or higher.

The timer mechanism shown in Fig. 20 comprises a series of timer cams designated $C^1$, $C^2$, $C^3$, etc., mounted on the timer shaft 270. The shaft is rotated continuously and makes one complete rotation during each cycle of operations of the bottle feeding, testing and other devices. The timer may be driven from the motor 42 through gearing including a sprocket chain 271, and speed reduction gearing 272. The timer mechanism also includes an electrical timer device 273 which may be of conventional construction comprising a stationary casing enclosing the electrical contact disks shown in Figs. 27, 28, and which are mounted to rotate with the timer shaft for controlling the various electrical circuits as hereinafter described. An adjusting device including a hand crank 274 operating through a screw threaded shaft 275 serves for adjusting the casing with the stationary contacts or brushes carried thereby.

The timer cam $C^7$ as shown in Figs. 21 and 22 controls the piston motor 60 (Fig. 2) which operates the bottle feeder as heretofore described. The timer cam includes an annular supporting plate 276 formed on a hub 277 which is keyed to the shaft 270. A pair of cam rings 278 and 279 is clamped to the plate 276 by screw bolts 280. The rotative position of the ring 278 may be determined by a positioning screw 281. The cam ring 279 is formed with cam lobes 282 which operate a valve lever 283 of a valve 284 which controls a supply of air under pressure or other operating fluid to the motor 60 (Fig. 2). Each cam lobe operates the valve and causes a complete reciprocation of the motor piston so that the number of bottles fed into the apparatus is equal to the number of cam lobes. The cam rings 278 and 279 may both be provided with cam lobes so that by shifting one ring relative to the other the effective length of the cam surfaces may be adjustably varied. The construction of the several timer cams may be identical except as to the length and number of the cam surfaces and their rotative positions which are determined by the required time of operation, during each cycle, of the motor or other device controlled thereby.

Figure 28:
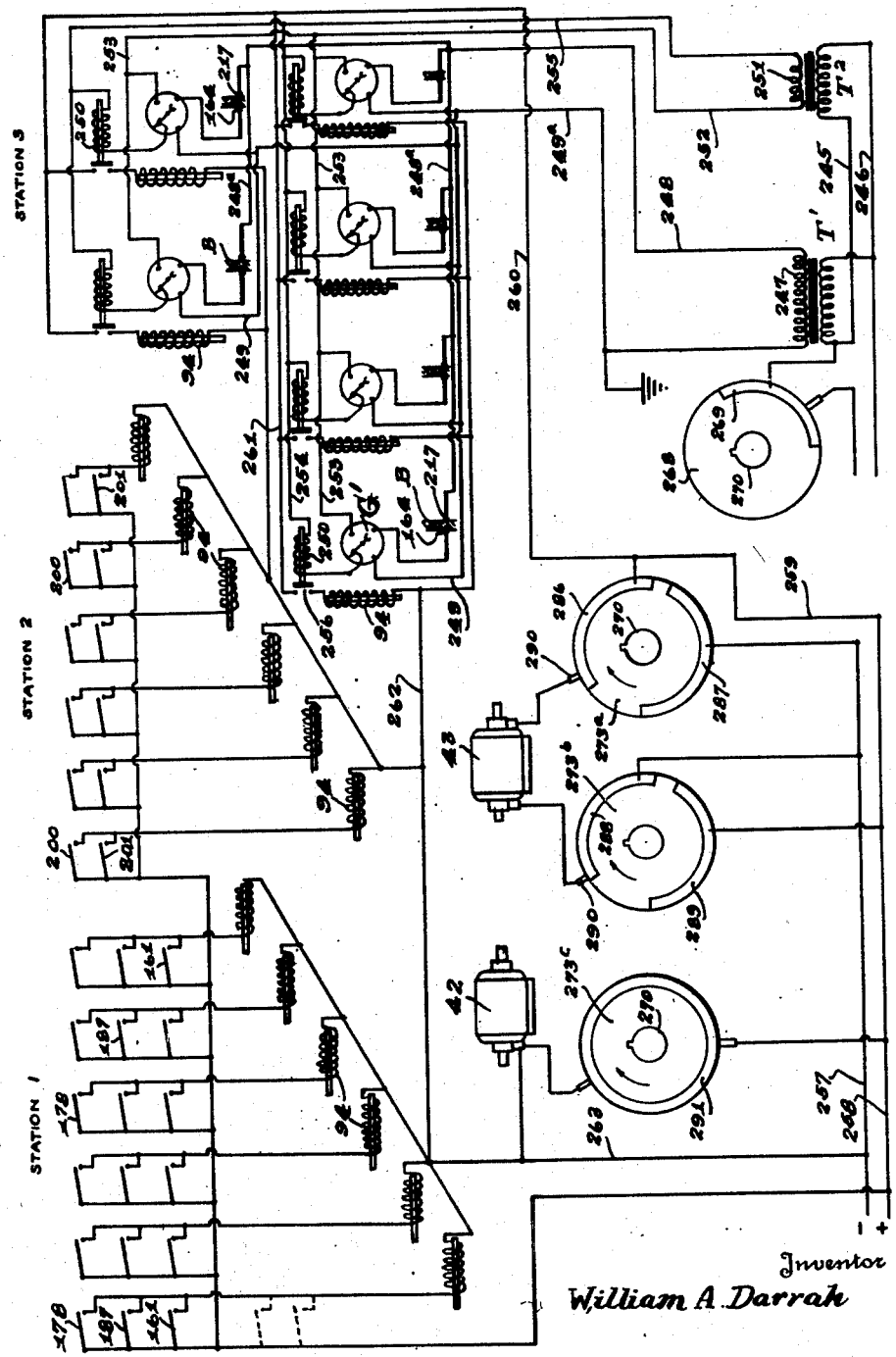
Fig. 28 is a wiring diagram of the electrical apparatus, except that shown in Fig. 27.

Referring to Fig. 28 the intermittently operated motor 43 derives its current from the mains 257, 258 and is periodically reversed as heretofore described, under the control of timer disks $273^a$ and $273^b$. The disk $273^a$ carries contact segments 286 and 287. The disk $273^b$ carries contact segments 288 and 289. Brushes 290 run on the timer disks, and as shown the motor terminals are connected to the positive and negative mains respectively through the contacts 286 and 288. As the timer rotates, the brushes 290 run off said segments so that the motor is stopped. After the required time interval the motor is again started, but in the reverse direction, by engagement of the brushes with the contact segments 287 and 289 connected respectively with the negative and positive mains. The motor 42 receives its current through a continuous contact ring 291 on a timer disk $273^c$ so that the motor runs continuously.

The trip magnet coils 94 at station 1 are connected in parallel circuits (Fig. 28) each of which includes switches 161, 178 and 187. The switch 161 (see Fig. 17) is comprised in the testing device by which the roundness of the bottles is tested as heretofore described. The switches 178 and 187 (Figs. 4 and 5) are comprised in the testing units for testing the height of the bottles. The trip magnets 94 at station 2 are likewise connected in parallel circuits each including switches 200 and 201 in the units for testing the bottle finishes.

The bottle vacuumizing and testing system will now be described, reference being had to Figs. 9 and 27. The air is exhausted from the group of bottles under test at station 3, through a main vacuum pipe line 295 which is connected through a manifold pipe or header 296 with the branch pipes 210 individual to the testing units. A main vacuum valve 297 in the line 295 is periodically opened by the timer cam $C^1$ for vacuumizing the group of bottles under test. The valve is then closed and the vacuumized bottles subjected to a test for leakage during a certain time interval. A vacuum release valve 298 is then opened by the timer cam $C^2$ to admit atmospheric air and dissipate the vacuum.

Each branch pipe 210 has therein a self-closing valve 299 which remains closed except when opened by an electromagnet coil 300. The circuits for the coils 300 are arranged in parallel and each connected to receive current from the secondary coil of a transformer $T^3$. Each said circuit includes therein a switch 301 which is closed by the bottle when the latter is brought to testing position, and a relay contact 302 which is normally in closed position but is opened by an electromagnet coil 303 when the latter is energized as presently described. The circuits for the coils 300 also each includes a switch 304. All of the switches 304 are opened and closed by means including a rod 305 connected to the switches and reciprocated by means of the timer cam $C^3$ operating through a rock arm 306 connected to said rod.

Each of the branch pipes 210 has connected thereto at a point between the valve 299 and the nozzle 217, a vacuum gauge 307 which registers the degree of vacuum produced within the bottles. The gauge pointer operates to open the circuit for the coil 303, or actuate a micro-switch in said circuit, when the vacuum reaches a certain predetermined degree. The circuit for the magnet coil 303 extends through a timer segment 308 on a timer disk $273^d$.

The operation of the vacuum control system may be described as follows: When a group of bottles has been fed into station 3 each bottle closes its switch 301 as shown. It will be noted that one bottle is missing at the fifth testing unit from the left (Fig. 27) so that the switch 301 in said unit remains open. When the bottles have been positioned for the test, the timer cam $C^3$ operates the rod 305 and closes the switches 304. This establishes a circuit for each of the coils 300, which circuit may be traced from the main 245 through conductor 309, contact 302, switch 301, coil 300, switch 304 and conductor 310 to main 246. The coils 300 are thus energized and open the valves 299 except the valve for the testing unit where the bottle is missing and the circuit remains open at the switch 301. The valve 299 being kept closed where a bottle is missing, prevents air entering the vacuum system through the open nozzle 217.

The timer cam $C^1$ now operates to open the vacuum valve 297 and vacuumize the bottles. The timer cam $C^3$ then operates to open the switches 304 so that the coils 300 are deenergized and all the valves 299 are closed. The cam $C^1$ also causes the vacuum valve 297 to close about this time. Following the closing of the vacuum valve 297 the vacuum release valve 298 is opened by its cam. The electrical timer 273ᵈ operates to establish the circuit through the transformer secondary about the time or shortly after the bottles have been vacuumized and the valves 299 closed. This establishes circuits for the magnet coils 303, each of which circuits may be traced from the transformer through conductors 311, 312, switch in vacuum gauge 307, coil 303 and conductor 313, timer segment 308 and conductor 314. If the bottle under test retains the required degree of vacuum the gauge 307 holds the circuit open so that the coil 303 remains dormant.

If, on the other hand, the degree of vacuum is below normal the switch at the gauge 307 is closed so that the coil 303 is energized and operates to open the contact 302 and at the same time close a contact 315 in a circuit containing the trip magnet coil 94, which circuit is connected across the mains 245 and 246. The trip magnet therefore operates to effect a discharge of the bottle. This situation is indicated in the third unit from the left, Fig. 27, where the switch on the pressure gauge remains closed and the coil 303 has operated to close a circuit for the associated magnet coil 94. At the unit where the bottle is missing the coil 303 is likewise energized and operates the corresponding trip magnet.

The valves 299 are retained in their closed position for a predetermined length of time. If, during this time, there is a slow leakage in any of the bottles the vacuum may be dissipated to a sufficient degree to close the circuit for the associated magnet coil 303 and effect a discharge of the bottle. Such leakage may occur when the finish of the bottle is defective and also when the bottle is cracked or contains a pinhole opening as sometimes occurs, or is otherwise defective in a manner to cause leakage. After the test, the cam C³ again closes the switches 304 momentarily so that the valves 299 are opened to admit atmospheric pressure to the bottles and release them from the spindles.

Just before this operation of the cam C³ to close the switches 304, the timer 273ᵈ opens the circuit for the secondary of transformer T³. This leaves the circuits for all the magnet coils 303 open so that all the contacts 302 are closed. This allows the circuits for all of the coils 300 to be completed and the valves 299 opened when the switches 304 are closed. The operation of the timer 273ᵈ to open the circuits as just described, insures the full release of vacuum from any defective bottle which might otherwise be held with a low vacuum. Without such operation of the timer, a slow leaker, for example, might allow the gauge 307 to close its switch and energize the coil 303 which would then open the contact 302 in the circuit of coil 300 and prevent opening of the valve 299 and release of the low vacuum.

Testing devices as shown in Figs. 25 and 26 may be employed for testing panel ware or other noncircular or flat sided bottles B¹. As here shown the arms 123 and 124 carry holding fingers 316 which serve in place of the rolls 121. These fingers may be mounted to swing on pivots 317 on the centering arms and are adjustable by means of adjusting screws 318. Means for testing one of the side surfaces of the bottle B¹ comprises a contact finger 319 pivoted at 320 on a supporting plate 321 which carries a pair of micro-switches 322, 323. If the side of the bottle under test is bulged, or shaped to move the finger 319 outwardly the micro-switch 322 is operated. On the other hand, if the side of the bottle is sunken or shaped to permit the finger 319 to move inwardly the switch 323 is actuated. These switches are connected in circuit with the trip magnets for effecting the operation of the latter. The opposite side of the bottle is tested by means of a contact finger 324 which is adapted to operate micro-switches 325 and 326 in the same manner as the switches 322 and 323 are operated. The plate 321 carrying the switches 322, 323, is carried on a rod 327 adjustably supported on the post 128. The plate 324ᵃ carrying switches 325, 326 may be mounted on a post 328 carried on the bracket 66ᵇ, said plate being adjustable up and down on the post.

*Operation*

The operation may be summarized as follows, reference being made to the timer chart, Fig. 29, which indicates the timing and sequence of the operations taking place during a complete cycle. With the parts as indicated at the left-hand end of the chart the gauge spindles 103 are in their lowered position (Figs. 3 to 9) and the tests at the several stations are in progress. The high tension current is on, under the control of the timer disk 268 (Fig. 28) so that the bottles at station 3 are undergoing the electrical test for wall thickness, etc. The bottle at this time has been evacuated and the vacuum valve 297 is in closed position under the control of its timer cam C¹. The belt frame 67 (Fig. 3) carrying the belt 41 is in its inward or operative position to which it has been moved by the motor 73 under the control of the timer cam C³. The conveyor belt 41 is at this time running backward, that is, in a direction reverse to its bottle conveying movement. This movement of the belt 41 is under the control of the electrical timer disks 273ᵃ and 273ᵇ (Fig. 28). The frame 129 (Figs. 3, 16) carrying the centering rolls is at this time in its forward or operative position, having been moved to such position by its motor 131 under the control of the timer cam C⁵, so that the bottles are held centered with respect to the gauging spindles. The bottles are also being rotated about their axes by the oppositely traveling belts 40, 41. While the electrical and vacuum tests are going on at station 3 the bottles at station 1 are being gauged for height and tested for various defects by the testing units shown in Figs. 4 and 5. The bottles at station 2 are undergoing the tests for defects in the bottle finish, etc., by the testing units shown in Figs. 6 to 8.

When the tests are completed the high tension current is cut off and the vacuum release valve is opened to restore atmospheric pressure within the bottles and release them from the suction grip of the spindles. Shortly after this the belt frame 67 (Fig. 3) is swung outwardly, withdrawing the belt 41 from the bottles. The centering roll frame 129 is also at this time withdrawn. This leaves the bottles free so that any defective bottles which have been registered can drop into the discard when the trap doors on which they are supported are dropped, which takes place about this time or immediately after the belt frame and centering roll frame have been withdrawn. The trap doors are opened and closed by the motor 91ᵃ (Fig. 3) operating under the control of the timer cam C⁶.

Following this operation the intermittently operating belt 41 is started in a forward direction and the belt frame 67 is moved inward to its operative position so that the bottles in the testing line are carried forward by the two conveyor belts 40, 41. The bottle feeder (Figs. 1 and 2) is now brought into operation by its motor 60 under the control of the timer cam C⁷ so that another group of bottles is fed between the conveyor belts and carried into station 1 while the bottles at station 3 are discharged and the bottles which have been tested at stations 1 and 2 are advanced to stations 2 and 3 respectively. As the bottle feeder completes the operation of placing a group of bottles between the conveyor belts, the spacer fingers 80 are swung down to operative position (Fig. 3) by their motor 84 under the control of the timer cam C⁸, for spacing the bottles and holding them in register with the gauge spindles. The belt frame 67 is now swung outwardly again and the intermittent belt 41 carried thereby comes to rest. The centering roll frame 129 now moves inward to its operative position for accurately centering and holding the bottles for the next test. The gauging spindles 103 now move downward to operative position, and the spacer fingers 80 are withdrawn. The parts are now in position for the testing operations. The vacuum valve opens and the bottles at station 3 are vacuumized. The intermittent belt 41 commences its reverse movement and is brought to operative position by the swinging of the belt frame 67 inward again so that the bottles are rotated about their axes. The high tension current is again turned on. This completes the cycle.

Modifications may be resorted to within the spirit and scope of my invention.

I claim:

1. Apparatus for testing round articles comprising means for advancing a row of the articles in a predetermined path, said means including endless traveling conveyors extending along said path in position to engage opposite sides of the articles and thereby carry the articles forward with the conveyors, means for intermittently reversing the direction of movement of one said conveyor and thereby causing the articles to be rotated about their axes, and means for holding the articles in predetermined positions during said rotation.

2. Apparatus for testing round articles comprising means for advancing a row of the articles in a predetermined path, said means including endless traveling conveyors extending along said path in position to engage opposite sides of the articles and thereby carry the articles forward with the conveyors, means for withdrawing one of said conveyors intermittently to an inoperative position, centering rolls, means for moving said rolls into position to engage the articles and hold them against forward movement, means for moving one of the conveyors intermittently in the reverse direction and thereby causing the articles to be rotated by the conveyors about stationary axes while held by the centering rolls, and testing devices for testing the articles during said rotation.

3. Apparatus for testing the top surfaces or finishes of bottles and similar articles which comprises a support for the articles, a testing unit spaced above the support, said unit including a horizontally disposed contact rod, means for lowering said rod and causing it to seat on said surface and extend thereacross and an electric contact device positioned and arranged to engage said surface at a point spaced from said contact rod, means for causing relative rotation of the article under test and the said rod and contact device, and electroresponsive means controlled by said contact device for indicating defective ware.

4. Apparatus for testing the top surfaces or finishes of bottles and similar articles which comprises a support for the articles, a testing unit spaced above the support, said unit including a contact rod arranged to seat on said surface and extend thereacross and an electric contact device positioned and arranged to engage said surface at a point spaced from said contact rod, electroresponsive means controlled by said contact device for indicating defective ware, and means for rotating the articles while under test.

5. Apparatus for testing sealing surfaces of bottles and like articles which comprises a support for the article, a testing unit positioned and spaced above said support, said unit comprising a contact rod, means for lowering the said unit and seating the rod on said surface, electrical switches, switch operating arms carried with said unit and comprising contact fingers arranged to engage said surface at points spaced from said arm, means for rotating the article relative to said testing unit, and means controlled by said switches for indicating imperfections in said surface.

6. Apparatus for testing articles comprising parallel belt conveyors arranged to engage the opposite sides of articles positioned along a testing line, means for driving the conveyors in a forward direction and thereby carrying the articles along said line through a plurality of testing stations, an article feeding mechanism for feeding articles into position to be advanced by said conveyors, controlling means for said feeding mechanism by which the latter is caused to operate periodically and thereby feed successive groups of the articles to said stations, testing units arranged in groups individual to said stations, said units including spindles arranged in a row along said testing line and above the path of the articles, means for periodically lowering the spindles to operative position in alternation with the said periodic operations of the feeding mechanism, and means for driving one of the conveyors in the reverse direction while the spindles are in their lowered position and the other conveyor moving in a forward direction, and thereby rotating the articles.

7. Apparatus for testing articles comprising parallel belt conveyors arranged to engage the opposite sides of articles positioned along a testing line, means for driving the conveyors and thereby carrying the articles along said line through a plurality of testing stations, an article feeding mechanism for feeding articles into position to be advanced by said conveyors, controlling means for said feeding mechanism by which the latter is caused to operate periodically and thereby feed successive groups of the articles to said stations, testing units arranged in groups individual to said stations, said units including spindles arranged in a row along said testing line and above the path of the articles, means for periodically lowering the spindles to operative position in alternation with the said periodic operations of the feeding mechanism, and means for driving one of the conveyors in the reverse direction while the spindles are in their lowered position and the other conveyor moving in a forward direction, and thereby rotating the articles and means cooperating with the testing units for automatically segregating the articles which fail to pass the tests from the other articles.

8. Article testing apparatus comprising a pair of conveyor belts including parallel strands spaced to receive articles to be tested and arranged to engage the opposite side walls of the articles, means for driving the belts and thereby advancing the articles along a testing line, means for intermittently reversing the direction of movement of one said belt and thereby causing the articles to be rotated about their own axes, and testing units for engaging the articles and testing them during said rotation.

9. Article testing apparatus comprising a pair of conveyor belts including parallel strands spaced to receive articles to be tested and arranged to engage the opposite side walls of the articles, means for driving the belts and thereby advancing the articles along a testing line, means for intermittently reversing the direction of movement of one said belt and thereby causing the articles to be rotated about their own axes, testing units for engaging the articles and testing them during said rotation, and groups of centering rolls individual to the testing units and arranged to engage the peripheries of the articles under test and hold them in testing position.

10. Article testing apparatus comprising a pair of conveyor belts including parallel strands spaced to receive articles to be tested and arranged to engage the opposite side walls of the articles, means for driving the belts and thereby advancing the articles along a testing line, testing units, means for periodically withdrawing one of the said belts, centering rolls, means for periodically moving the centering rolls to and from position for holding the articles in a centered position with respect to the testing units, and means for periodically reversing the direction of movement of one said conveyor belt and thereby rotating the articles about stationary axes during the testing operations and while held by said centering rolls.

11. Apparatus for testing round articles, comprising means for advancing the articles in a predetermined path, said means including a pair of parallel driving elements spaced to receive the articles therebetween and extending along said path, means for advancing said elements lengthwise of the path and thereby moving the articles along said path, means for holding the articles against forward movement at a testing station intermediate the ends of said path, testing means operable to test the articles at said station, and means for reversing the direction of movement of one of said driving elements during the test and thereby causing the articles to be rotated by the driving elements during said test.

12. Apparatus for testing round articles comprising parallel driving elements spaced to receive the articles therebetween and providing a path along which the articles are conveyed to a testing station, a testing device at said station, means for moving said driving elements along said path and holding them against the articles during said movement and thereby advancing the articles to the testing station, and means for periodically reversing the direction of movement of one said driving element and causing them to move in opposite directions while held in contact with the articles and thereby causing the articles to be rotated about their axes at said station.

13. Article testing apparatus comprising article conveying means, automatic means for causing intermittent forward traveling movements of the conveying means alternating with rest periods and thereby bringing groups of articles to a plurality of testing stations in succession, automatic means for delivering the articles of a group, comprising a predetermined number of articles, singly and in succession to said conveying means during each said forward traveling movement and causing each said group of articles to be brought by said traveling movements of the conveying means to a plurality of testing stations in succession, each said forward traveling movement of the conveying means being continuous throughout the delivery thereto of the group of articles, groups of testing devices individual to and located at said stations, the number of testing devices in each said group corresponding to the said number of articles in a group, means for operating said groups of testing devices simultaneously during said rest periods and thereby simultaneously testing articles at all of said stations, and means for rotating the articles about stationary axes during said testing operations.

14. Article testing apparatus comprising means for advancing a continuous row of round articles and thereby bringing them in succession to a testing station, said means including conveyor belts having spaced parallel article-engaging surfaces arranged to engage the round surfaces of the articles at diametrically opposite points, means for driving one said belt continuously and the other intermittently with the said article contacting surfaces moving in a forward direction for advancing the articles, means mounted and operable independently of the conveyor belts for holding the articles against forward movement at the testing station, and means for testing the articles.

15. Apparatus for testing round articles, comprising means for advancing the articles in a predetermined path, said means including a pair of parallel driving elements extending along said path and spaced to receive the articles therebetween with the driving elements in contact with the round surfaces of the articles at diagrammatically opposite points, means for advancing said elements lengthwise of the path and thereby moving the articles along said path, means operable independently of the said article advancing means for holding the articles against forward movement at a testing station intermediate the ends of said path, testing means operable to test the articles at said station, and means for discontinuing the application of the forward driving force of one of said driving elements while retaining the other in driving contact with the articles and thereby causing the articles to be rotated by the said other driving element during said test.

WILLIAM A. DARRAH.